(12) United States Patent
Yadav

(10) Patent No.: US 9,083,710 B1
(45) Date of Patent: Jul. 14, 2015

(54) SERVER LOAD BALANCING USING MINIMALLY DISRUPTIVE HASH TABLES

(75) Inventor: Navindra Yadav, Cupertino, CA (US)

(73) Assignee: GOOGLE INC., Mountain View, CA (US)

( * ) Notice: Subject to any disclaimer, the term of this patent is extended or adjusted under 35 U.S.C. 154(b) by 401 days.

(21) Appl. No.: 13/342,493

(22) Filed: Jan. 3, 2012

(51) Int. Cl.
- *G06F 15/16* (2006.01)
- *H04L 29/08* (2006.01)
- *H04L 12/803* (2013.01)

(52) U.S. Cl.
CPC ........... *H04L 67/1004* (2013.01); *H04L 47/125* (2013.01); *H04L 67/1002* (2013.01); *H04L 67/1008* (2013.01); *H04L 67/1023* (2013.01)

(58) Field of Classification Search
CPC .............. H04L 67/1004; H04L 47/125; H04L 67/1002; H04L 67/1023; H04L 67/1008
USPC ......... 709/238–242; 370/235, 395.31, 395.32
See application file for complete search history.

(56) References Cited

U.S. PATENT DOCUMENTS

| | | | |
|---|---|---|---|
| 6,438,652 B1 * | 8/2002 | Jordan et al. | 711/120 |
| 6,980,550 B1 * | 12/2005 | Yip et al. | 370/392 |
| 7,340,532 B2 | 3/2008 | Swildens | 709/238 |
| 7,610,485 B1 | 10/2009 | Yadav | |
| 7,734,814 B2 * | 6/2010 | Swildens | 709/238 |
| 8,248,928 B1 * | 8/2012 | Wang et al. | 370/230 |
| 2002/0026560 A1 * | 2/2002 | Jordan et al. | 711/120 |
| 2003/0195919 A1 * | 10/2003 | Watanuki et al. | 709/105 |
| 2003/0217096 A1 * | 11/2003 | McKelvie et al. | 709/202 |
| 2004/0197079 A1 * | 10/2004 | Latvala et al. | 386/46 |
| 2006/0075489 A1 | 4/2006 | Ganguly et al. | |
| 2008/0021908 A1 | 1/2008 | Trask et al. | |
| 2008/0263316 A1 | 10/2008 | Ross | |
| 2010/0251008 A1 * | 9/2010 | Swildens | 714/4 |
| 2010/0322250 A1 * | 12/2010 | Shetty et al. | 370/395.32 |
| 2011/0283082 A1 | 11/2011 | McKenney et al. | |
| 2012/0143876 A1 | 6/2012 | Srinivasan et al. | |

OTHER PUBLICATIONS

Notice of Allowance dated May 9, 2013, issued in U.S. Appl. No. 13/342,503, filed Jan. 3, 2012 (16 pp).
Office Action dated Dec. 17, 2012, issued in U.S. Appl. No. 13/342,503, filed Jan. 3, 2012 (26 pp).
Pending U.S Pat. Appl. No. 13/342,503, filed Jan. 3, 2012.
Cryptographic hash function—Wikipedia. http://en.wikipedia.org/wiki/Cryptographic_hash_function; dated Jan. 3, 2012.
Hash function—Wikipedia. http://en.wikipedia.org/wiki/Hash_function; dated Jan. 3, 2012.

* cited by examiner

*Primary Examiner* — Moustafa M Meky
(74) *Attorney, Agent, or Firm* — Young Basile Hanlon & MacFarlane P.C.

(57) ABSTRACT

Methods and articles of manufacture relating to server load balancing are disclosed. In one aspect, the method includes load balancing a plurality of network packets among a plurality of servers using a minimally disruptive hash table having a plurality of hash table buckets by identifying a plurality of elements, each element corresponding to at least one of the plurality of servers, inserting at least two of the identified plurality of elements into the minimally disruptive hash table so that at least some of the hash table buckets each include one of the plurality of elements, receiving one of the plurality of network packets, determining a hash table index for the received network packet using a hash function, identifying an element stored in a hash table bucket corresponding to the hash table index, and transmitting the received network packet to a server corresponding to the identified element.

20 Claims, 13 Drawing Sheets

| KEY (DESTINATION IP) | HASH INDEX | HASH BUCKET |
|---|---|---|
| 10.1.0.1 | 1 | ADJACENCY 2 |
| 10.1.0.2 | 2 | ADJACENCY 3 |
| 10.1.0.3 | 3 | ADJACENCY 4 |
| 10.1.0.4 | 0 | ADJACENCY 1 |
| 10.1.0.5 | 1 | ADJACENCY 2 |
| ⋮ | ⋮ | ⋮ |
| 10.1.255.253 | 2 | ADJACENCY 3 |
| 10.1.255.254 | 3 | ADJACENCY 4 |

SERVER LOAD BALANCING USING MINIMALLY DISRUPTIVE HASH TABLES

TECHNICAL FIELD

The present invention relates in general to server load balancing and in particular to server load balancing using minimally disruptive hash tables.

BACKGROUND

Server load balancing is the process of distributing network traffic among servers for processing. The distributed network traffic can include stateful or stateless traffic. Stateful network traffic can be organized into network flows, each of which typically are consistently handled by one server to avoid disruptions in service. Stateful network traffic can include, for example, TCP/IP traffic or traffic to a website that stores state information about a particular "session" (i.e. a webmail application). To the contrary, stateless traffic does not have to be handled consistently by one server. Stateless network traffic can include, for example, UDP/IP traffic or domain name system (DNS) query traffic.

Generally speaking, hash tables are data structures used by computing devices to store elements of data. In one example, hash tables store elements in hash table buckets. Elements are stored in the hash table buckets and are accessed and inserted using a hash function. A hash function takes as input in one example a key associated with a particular element. The output of the hash function is a hash table index associated with a hash table bucket. The hash table index can be used to identify which hash table bucket to read an element from or insert an element into.

SUMMARY

Disclosed herein are embodiments of methods, apparatuses, and systems relating to server load balancing using minimally disruptive hash tables.

One aspect of the disclosed embodiments is a method of load balancing a plurality of network packets among a plurality of servers using a minimally disruptive hash table. The method includes identifying a plurality of elements, each element corresponding to at least one of the plurality of servers, inserting at least two of the identified plurality of elements into the minimally disruptive hash table so that at least some of the hash table buckets each include one of the plurality of elements, receiving one of the plurality of network packets, determining a hash table index for the received network packet using a hash function, identifying an element stored in a hash table bucket corresponding to the hash table index, and transmitting the received network packet to a server corresponding to the identified element.

Another aspect of the disclosed embodiments is a computing system for load balancing a plurality of network packets among a plurality of servers using a minimally disruptive hash table. The computing system includes at least one memory and at least one processor. The processor is configured to execute instructions stored in the at least one memory to identify a plurality of elements, each element corresponding to at least one of the plurality of servers, insert at least two of the identified plurality of elements into the minimally disruptive hash table so that at least some of the hash table buckets each include one of the plurality of elements, receive one of the plurality of network packets, determine a hash table index for the received network packet using a hash function, identify an element stored in a hash table bucket corresponding to the hash table index, and transmit the received network packet to a server corresponding to the identified element.

Another aspect of the disclosed embodiments is a computer-readable medium having computer-executable instructions for performing a method of load balancing a plurality of network packets among a plurality of servers using a minimally disruptive hash table, wherein the instructions include identifying a plurality of elements, each element corresponding to at least one of the plurality of servers, inserting at least two of the identified plurality of elements into the minimally disruptive hash table so that at least some of the hash table buckets each include one of the plurality of elements, receiving one of the plurality of network packets, determining a hash table index for the received network packet using a hash function, identifying an element stored in a hash table bucket corresponding to the hash table index, and transmitting the received network packet to a server corresponding to the identified element.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
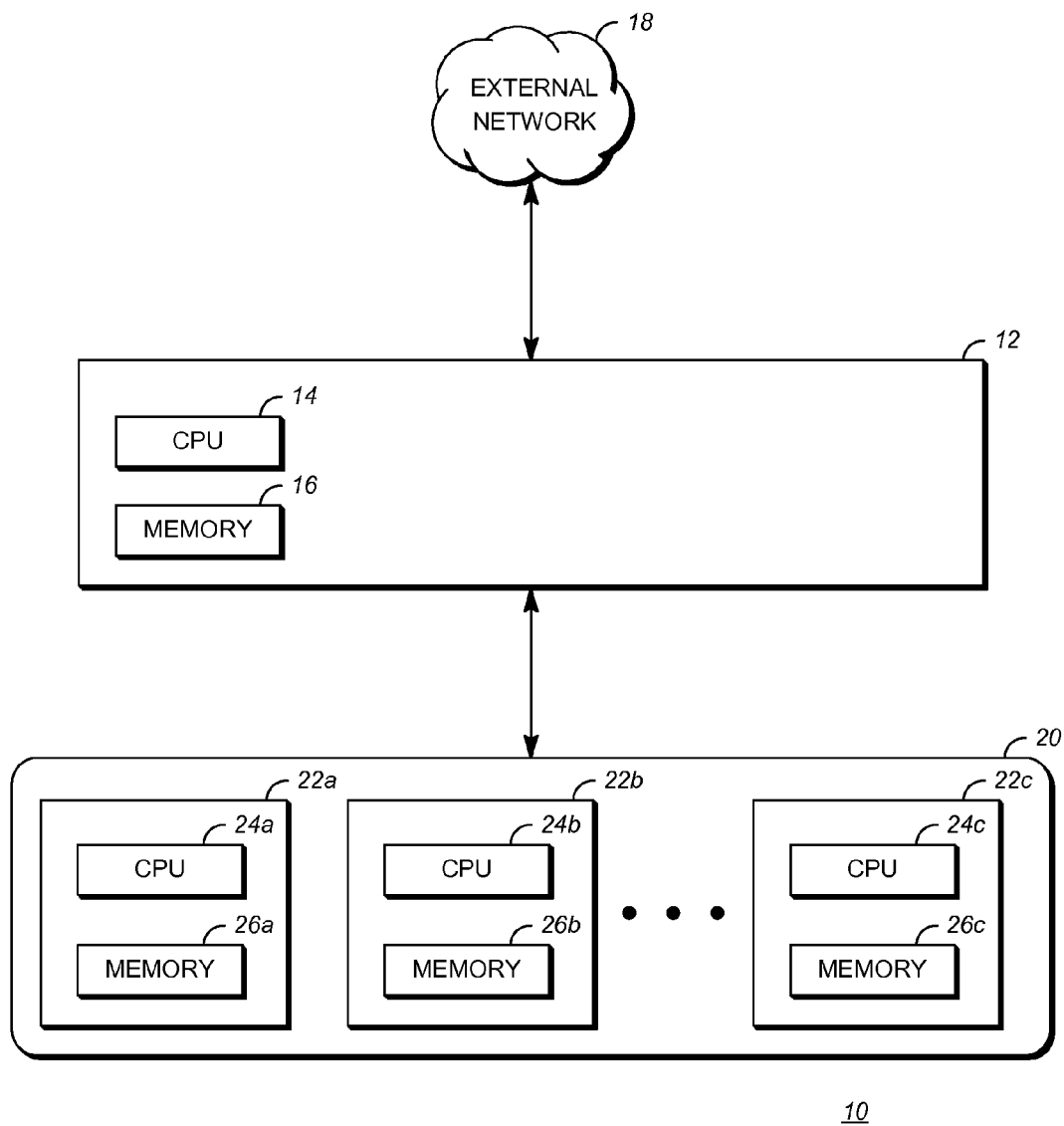
FIG. 1 is a diagram of a computing scheme according to embodiments of the disclosed subject matter.

Server load balancing for stateful network traffic can be controlled using a type of session state table. A session state table includes an entry for each network flow including identifying information of the network flow and a server to which that network flow is directed. Using the session state table, a load balancer device can perform a lookup in the session state table for each network packet received to determine the appropriate destination server for that packet.

The approach of using session state tables to control the destinations of network flows can have a number of disadvantages, such as the following. First, session state tables can consume a large amount of memory. For example, a session state table capable of storing four million IPv4 sessions would require at least 120 MB of memory. Second, session state tables can increase latency, because a search for an entry associated each network packet received and transmitted must be performed. If, for example, the session state table includes four million entries, this search can be quite expensive in time and resources. Third, session state tables are prone to denial of service attacks. For example, a session state table can be filled with "garbage" packet flows that fill up the session state table to capacity (e.g. TCP SYN attacks). The above disadvantages also have varying impacts on power consumption, load balancer physical footprint, cost, and reliability.

Described herein are techniques for server load balancing that maintain the state of most packet flows without requiring use of a session state table. In other words, the disclosed techniques are generally stateless while maintaining stateful network traffic. These techniques make use of a minimally disruptive hash table. The minimally disruptive hash table maps received network packets to one or more destination servers. Minimally disruptive hash tables minimize disruptions of key value (i.e. network packet and/or packet flow identifier) to element (i.e. server) associations when elements are added to and deleted from the hash table. Minimally disruptive hash tables are described in additional detail later.

Use of a minimally disruptive hash table for load balancing can improve at least some of the potential disadvantages of session state tables described above. First, the hash table load balancing techniques require less memory, since the hash table need only include entries corresponding to each server, instead of entries capable of uniquely identifying each session. For example, a hash table containing ten thousand server entries could utilize as little as 200 KB of memory. Second, the use of hash tables can improve latency, since hash tables have the property of constant time searches. Third, since hash tables do not store the state of any packet flows, they are immune to typical denial of service attacks. The above attributes of using hash tables can contribute to reduced power consumption, reduced physical footprint, reduced cost, and/or improved reliability.

Server indirection tables and multiple hash functions can also be used to optimize operation of these load balancing techniques. In some implementations, the techniques described herein can be combined with the use of session state tables. For example, load balancing can be performed using a minimally disruptive hash table until a new server is added to the hash table that disrupts a small number of packet flows. Instead of allowing the small number of packet flows to be disrupted, those packet flows can be added to a session state table. These packet flows will be load balanced using the session state table instead of the hash table. As these packet flows are stopped, the session state table can be automatically shrunk over time as new packet flows are handled using the hash table.

In another alternative implementation, the load balancer device can be configured to use either the hash table techniques or session state table techniques based on the type of network packet and/or packet flow. For example, the load balancer device can be configured to use session state techniques to load balance a network application having high sensitivity to session state (i.e. voice over internet protocol (VoIP) services), whereas all other network traffic is load balanced using minimally disruptive hash table techniques.

FIG. 1 is a diagram of a computing scheme 10 according to embodiments of the disclosed subject matter. An exemplary load balancer device 12 can be, for example, a computer having an internal configuration of hardware including a processor such as a central processing unit (CPU) 14 and a memory 16. CPU 14 can be a controller for controlling the operations of computing device 12. The CPU 14 is connected to memory 16 by, for example, a memory bus. Memory 16 can include random access memory (RAM) or any other suitable memory device. Memory 16 can store data and program instructions which are used by the CPU 14. Load balancer device 12 can take the form of any suitable computing device, such as network routers or switches. Other suitable implementations of load balancer device 12 are possible.

Load balancer device 12 can be connected to an external network 18. Load balancer device 12 can be configured to receive network traffic from external network 18. The received network traffic can be processed using at least some of the techniques described herein and then transmitted to a server in server group 20, such as servers 22a-c. Each of servers 22a-c can include CPU 24a-c and memory 26a-c. Additional servers can be included in server group 20.

In one implementation, load balancer device 12 receives all network traffic destined for any server in server group 20. When a server is identified for a particular network packet by load balancer device 12, it can encapsulate that network packet into a container packet and forward the container packet to the identified server. For example, the container packet can include a header having one or more addresses of the identified server that enables transmission of the network packet to the identified server while keeping the network packet intact.

As used herein, the term computing device is understood to include any combination or implementation of computing devices, computing device groups, or any other configuration of computing devices. Other implementations of the computing scheme 10 are possible, and components can be added, removed, modified, or replaced in various implementations. In one exemplary implementation, load balancer device 12 is implemented using multiple interconnected computing devices.

Although FIG. 1 depicts that processors 14, 24a-c and memory 16, 26a-c are integrated into single units, this depiction is exemplary only. The operations of load balancer device 12 and/or servers 22a-c can be distributed across multiple processors on the same machine or different machines or across a network such as a local area network, wide area network or the Internet and the terms "load balancer" and "server" can encompass such multi-machine systems. Memories 16, 26a-c can also be integral units (such as the RAM within a computer) or can be distributed across multiple machines such as a network-based memory or memory in multiple machines performing the operations of load balancer device 12 and/or servers 22a-c.

FIGS. 2-8 are related to the minimally disruptive hash tables used for the server load balancing techniques described herein. Hash tables have various uses in computing systems. In one exemplary use, a hash table is utilized to associate a key value to an element stored in a hash bucket in the hash table. For example, this association can be used in networking routers and switches for routing packets in a network. In many such applications, it is desirable for a particular key to remain associated with the same element after the initial association.

In typical hash tables, a particular key does not always remain associated with the same hash bucket. In order to map a key value to a hash bucket, a hash function is used. The hash function is configured to have a number of output values equal to the number of hash buckets included in the hash table so that any possible key value can be associated with a hash bucket using the hash function. In the case where the hash table is refactored (i.e. the number of hash buckets change), a significant number of associations between hash buckets and key values will change. The change is because the hash function will have to be adjusted so that the total possible outputs of the hash function will be equal to the new number of hash buckets in the hash table.

Described herein is a minimally disruptive hash table where changing a number of elements stored within the hash table does not require refactoring the hash table. A minimally disruptive hash table is created with a number of hash buckets greater than or equal to a maximum expected count of elements to be stored in the hash table over period in which the hash table is used. The maximum expected count can be application dependent and, for example, can be determined automatically when the hash table is created or can be predetermined. Elements added to the hash table are distributed throughout the available hash buckets. The distribution of elements within the hash table can be equally or unequally weighted. For example, if equally weighted, each element will be targeted to occupy an equal number of hash buckets. As another example, if unequally weighted, each element can have an associated weight that controls a number of hash buckets that each element is targeted to occupy.

Figure 2A:
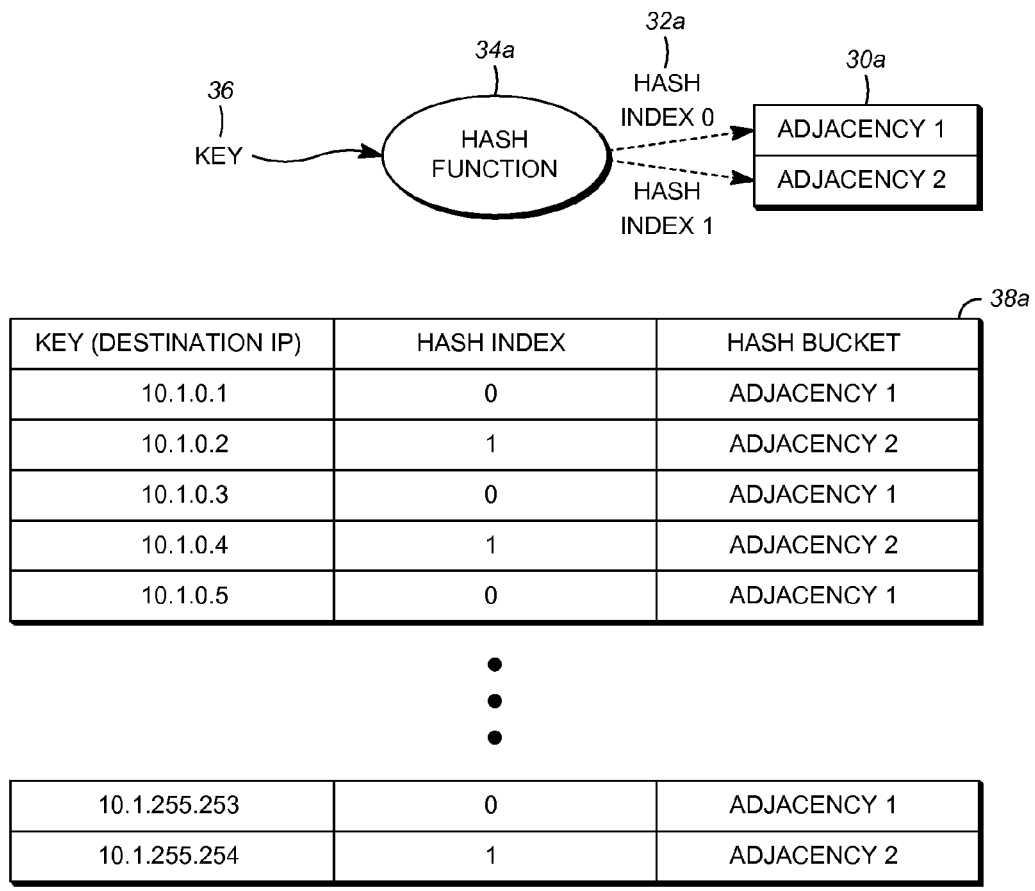
FIGS. 2A and 2B are block diagrams of one exemplary hash table that requires refactoring when elements are added or removed.
Figure 2B:
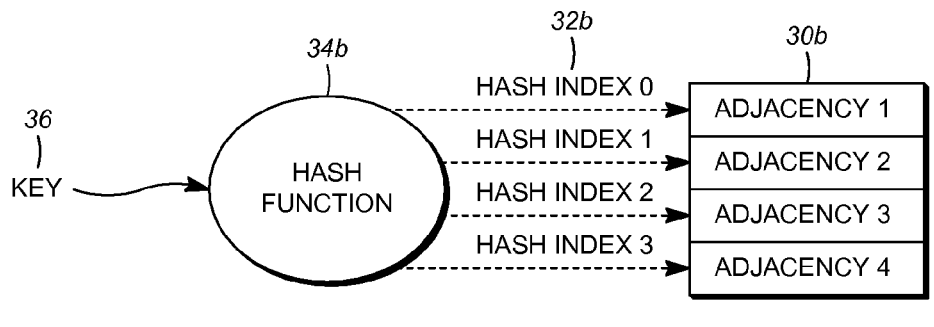

FIGS. 2A and 2B are block diagrams of one exemplary hash table that requires refactoring when elements are added or removed according to embodiments of the disclosed subject matter. FIGS. 2A and 2B depict a hash table used for (Un)Equal Cost Multiple Path (ECMP) IP routing. In an IP network, network packets can sometimes be routed to a destination over a number of different network paths. ECMP IP routing can be used to select a network path for each packet sent through a device by selecting adjacent network connections (i.e. adjacency) to transmit each packet through. Network packets are typically associated with a packet flow, which is, for example, a sequence of packets sent from a source application to a destination application. In a typical ECMP implementation, it is desirable for the transmission of each packet flow to be maintained on a consistent network path to avoid reordering of packets within the packet flow. For example, the performance of some applications and protocols (such as TCP) can be degraded when packets in a flow are reordered.

With respect to FIG. 2A, a hash table 30a is shown having two hash buckets. The hash buckets include elements associated with "Adjacency 1" and "Adjacency 2." The hash buckets of hash table 30a are accessed by way of hash table indexes 32a. In this example, hash table indexes 32a include "Hash table index 0" and "Hash table index 1" which are each associated with one of the hash buckets. A hash function 34a is used to convert a key value 36 to one of the hash table indexes 32a. In this example, the key value 36 is a destination IP address of a packet to be routed using ECMP. However, in other examples, other key values may be used, such as a combination of source and destination IP addresses.

Routing table 38a contains exemplary key values, hash table indexes 32a, and hash bucket elements from hash table 30a associated with the hash table indexes 32a based on hash function 34a. For example, key (destination IP) 10.1.0.1 is associated with hash table index 0 and hash bucket (adjacency) 1, and key (destination IP) 10.1.0.2 is associated with hash table index 1 and hash bucket (adjacency) 2. The remaining keys similarly alternate association with the two hash buckets.

Now with respect to FIG. 2B, a hash table 30b is shown having four hash buckets. Hash table 30b is an example of hash table 30a being refactored (i.e. resized) from two hash buckets to four hash buckets. This can be done, for example, when a number of adjacencies changes. In this example, hash table indexes 32b include in addition to 32a a "Hash table index 2" and "Hash table index 3." Hash table indexes 32b are each associated with one of the hash buckets. A hash function 34b is used to convert a key value 36 to one of the hash table indexes 32b. Hash function 34b can be a modification of hash function 34a configured to produce four output values (hash table indexes) instead of two output values (hash table indexes).

Routing table 38b contains exemplary key values, hash table indexes 32b, and hash bucket elements from hash table 30b associated with the hash table indexes 32b based on hash function 34b. For example, key (destination IP) 10.1.0.1 is now associated with hash table index 1 and hash bucket (adjacency) 2, and key (destination IP) 10.1.0.2 is associated with hash table index 2 and hash bucket (adjacency) 3. The remaining keys alternate association with the four hash buckets now included in hash table 30b.

Notably, in routing table 38b, the adjacency associated with each key (destination IP) has changed because of the refactoring of the hash table. Generally speaking, when a typical hash table is refactored, nearly all key to element associations will be lost. The associations that are maintained (if any) will depend on numerous implementation specific factors, including the size of the hash table, number of hash buckets added or deleted, and the hash function utilized. For example, a hash function having a poor output distribution over the hash buckets may retain more associations than another hash function having a good output distribution.

Figure 3A:
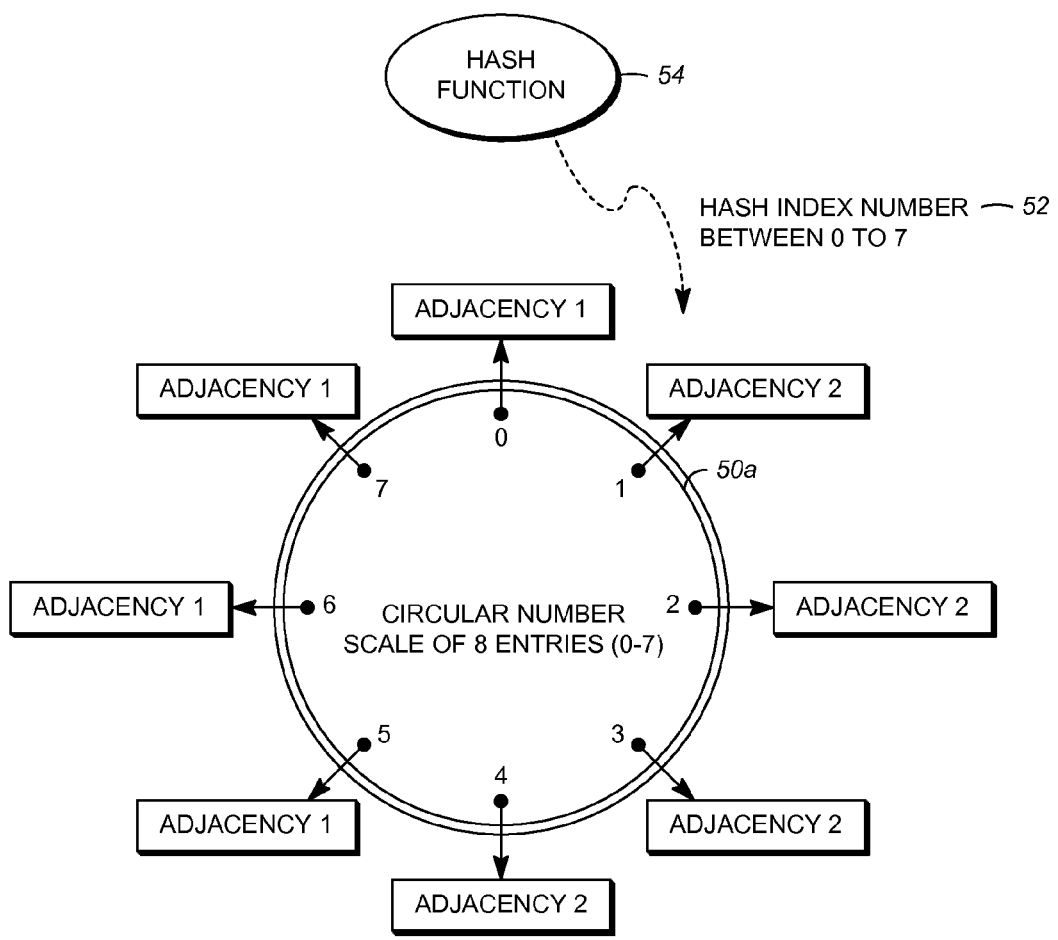
FIGS. 3A and 3B are block diagrams of one exemplary minimally disruptive hash table that does not require refactoring when elements are added or removed according to embodiments of the disclosed subject matter.
Figure 3B:
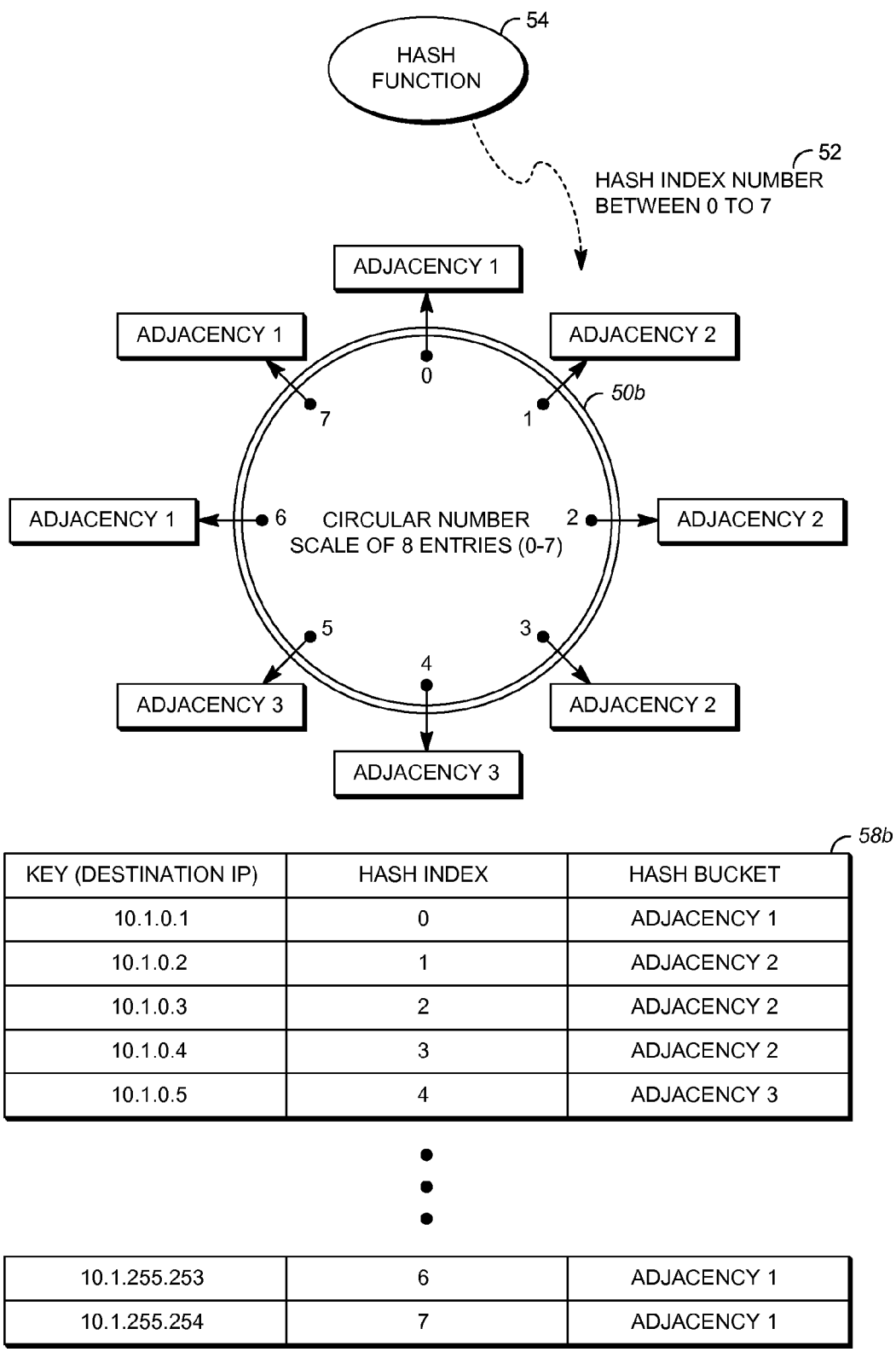

FIGS. 3A and 3B are block diagrams of one exemplary minimally disruptive hash table that does not require refactoring when elements are added or removed according to embodiments of the disclosed subject matter. Similar to FIGS. 2A and 2B, FIGS. 3A and 3B depict a hash table usable for ECMP IP routing. However, unlike FIGS. 2A and 2B, FIGS. 3A and 3B illustrate the use of a minimally disruptive hash table to avoid unnecessary changes in the associations between keys and hash buckets when adding or removing elements from the hash table.

With respect to FIG. 3A, a minimally disruptive hash table 50a is shown having eight hash buckets. The hash buckets include two distinct elements associated with "Adjacency 1" and "Adjacency 2." The two distinct elements are distributed throughout the hash buckets. The hash buckets of minimally disruptive hash table 50a are accessed by way of hash table indexes 52. In this example, hash table indexes 52 include indexes from 0 to 7 which are each associated with one of the hash buckets. A hash function 54 is used to convert a key value 56 to one of the hash table indexes 52. In this example, the key value 56 is a destination IP address of a packet to be routed using ECMP. However, in other examples, other key values may be used, such as a combination of source and destination IP addresses.

The distinct elements included in hash table 50a are distributed throughout the table using techniques such as those described later with respect to FIGS. 5-8. In this example, the "Adjacency 1" element is stored in hash buckets associated with hash table indexes 0 and 5-7. Correspondingly, the "Adjacency 2" element is stored in hash buckets associated with hash table indexes 1-4.

Routing table 58a contains exemplary key values, hash table indexes 52, and hash bucket elements from hash table 50a associated with the hash table indexes 52 based on hash function 54. For example, key (destination IP) 10.1.0.1 is associated with hash table index 0 and hash bucket 0 (adjacency 1), and key (destination IP) 10.1.0.2 is associated with hash table index 1 and hash bucket 1 (adjacency 2). The remaining keys are similarly associated with one of the eight hash buckets and one of the two adjacencies.

Now with respect to FIG. 3B, a minimally disruptive hash table 50b is shown having eight hash buckets, similar to minimally disruptive hash table 50a. Hash table 50b is an illustrative example of adding an element to hash table 50a without refactoring hash table 50a. Techniques for adding an element to a minimally disruptive hash table are described further with respect to FIGS. 5-6.

Similar to hash table 50a, the three distinct elements of hash table 50b are distributed throughout the hash buckets. The hash buckets of minimally disruptive hash table 50b are accessed by way of hash table indexes 52. In this example, hash table indexes 52 include indexes from 0 to 7 which are each associated with one of the hash buckets. A hash function 54 is used to convert a key value 56 to one of the hash table indexes 52.

The distinct elements included in hash table 50a are distributed throughout the table using techniques such as those described later with respect to FIGS. 5-8. In this example, the "Adjacency 1" element is stored in hash buckets associated with hash table indexes 0 and 6-7. The "Adjacency 2" element is stored in hash buckets associated with hash table indexes 1-3. The new "Adjacency 3" element is stored in hash buckets associated with hash table indexes 4 and 5. Notably (unlike hash tables 30a-b), the addition of the new "Adjacency 3" element only disturbs the key to element associations for the hash buckets in which the new element is added (hash table indexes 4 and 5).

Routing table 58b contains exemplary key values, hash table indexes 52, and hash bucket elements from hash table 50a associated with the hash table indexes 52 based on hash function 54. For example, key (destination IP) 10.1.0.1 is still associated with hash table index 0 and hash bucket 0 (adjacency 1), and key (destination IP) 10.1.0.2 is still associated with hash table index 1 and hash bucket 1 (adjacency 2). The only key to element associations that are changed are those associated with hash table indexes 4 and 5. The remaining key to element associations are maintained.

The number of key to element associations impacted by a change to a minimally disruptive hash table can be expressed mathematically. For example, a number of hash buckets x changed when adding y elements can be expressed using formula 1:

$$x = \sum_{i=e}^{e+y} \begin{cases} \dfrac{N}{e+i}, & i > (N\%(e+i)) \\ \dfrac{N}{e+i} + 1, & i \le (N\%(e+i)) \end{cases} \quad \text{; wherein} \quad (1)$$

e is a number of elements stored in the hash table before adding the y new elements;
% is the modulo operator; and
N is a total number of hash buckets in the hash table.

Figure 4:
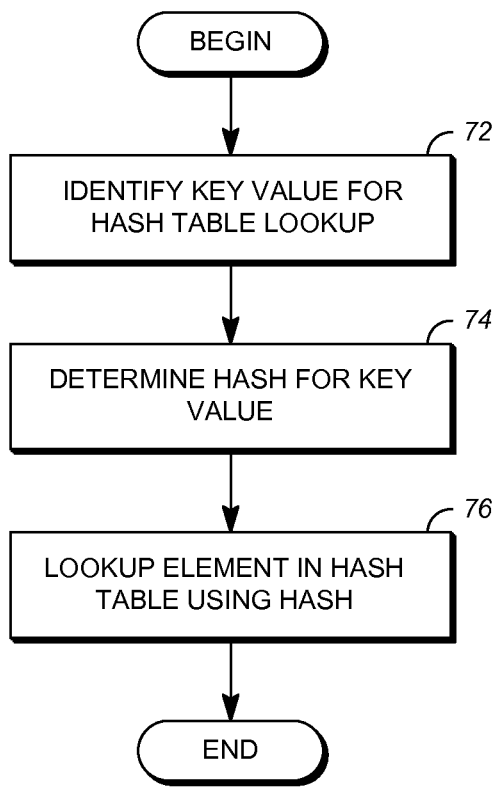
FIG. 4 is a flowchart of a technique of searching for an element in a minimally disruptive hash table according to embodiments of the disclosed subject matter.

FIG. 4 is a flowchart of a technique of searching for an element in a minimally disruptive hash table according to embodiments of the disclosed subject matter. First, at stage 72, a key value is identified for the hash table lookup. For example, in many networking use-cases, the key value can be any value associated with a packet or other piece of data to be associated with an element stored in a minimally disruptive hash table. One exemplary key value is an IP address. However, other values and combinations of values can be used for the key value.

Once the key value is identified, a hash for the key value is determined at stage 74. The hash can be determined using a hash function, such as hash function 54 described earlier. After the hash is determined, it is used to lookup an element from the hash table at stage 76.

Figure 5:
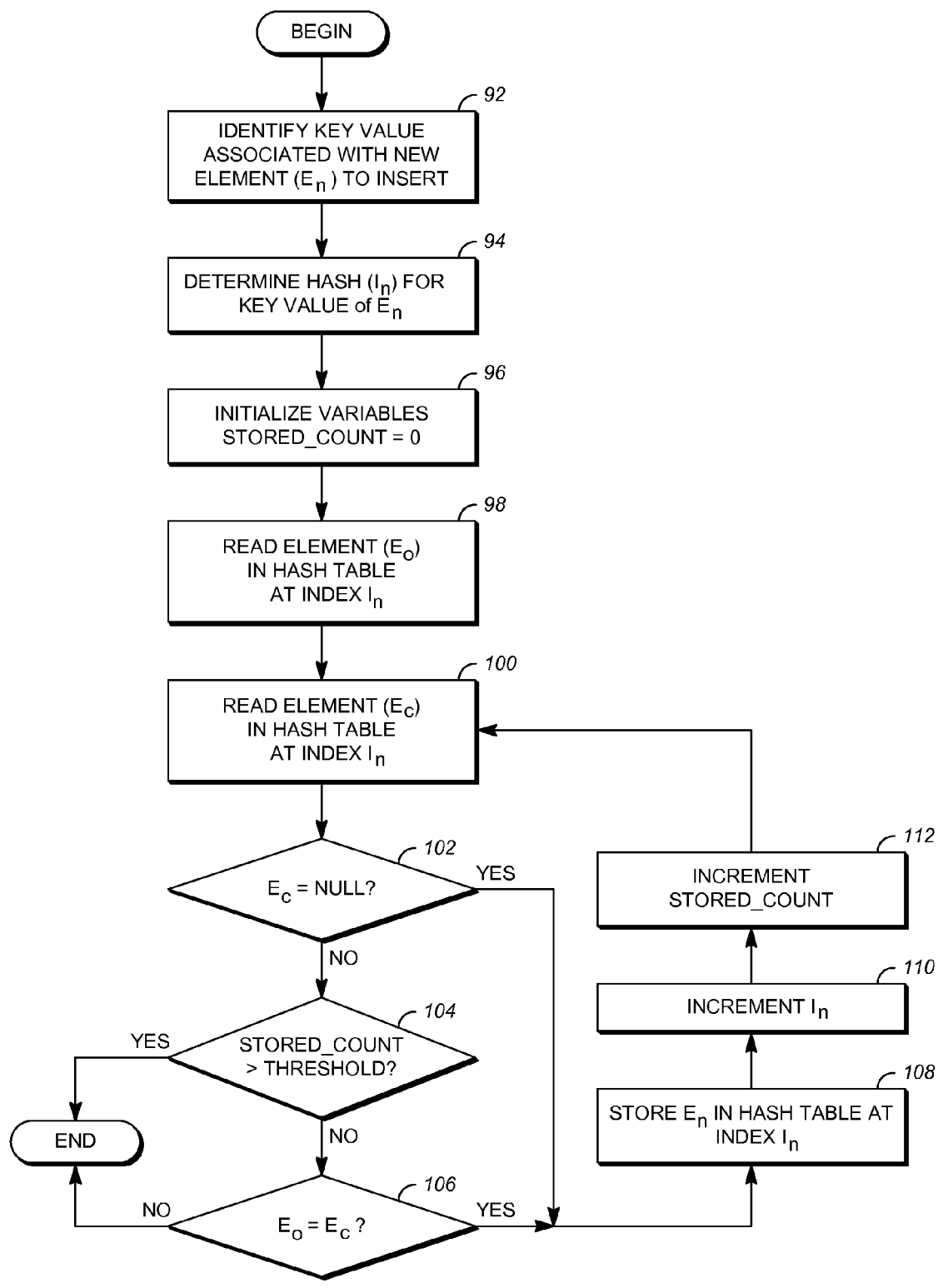
FIG. 5 is a flowchart of one exemplary technique of adding an element to a minimally disruptive hash table according to embodiments of the disclosed subject matter.

FIG. 5 is a flowchart of one exemplary technique 90 of adding an element to a minimally disruptive hash table according to embodiments of the disclosed subject matter. At stage 92, a key value associated with a new element $E_n$ to be inserted is identified. Similar to the search techniques described above, the key value can be any value associated with the new element $E_n$ or any combination of values. For example, with respect to FIG. 3A above, the key value for an adjacency could be the index number of that adjacency (i.e. 1 or 2).

Next, a hash $I_n$ is determined at stage 94 for the identified key value. Hash $I_n$ can be determined using any hash function. At stage 96, variables needed for technique 90 are initialized. For example, the variable STORED_COUNT can be initialized to zero. The variable STORED_COUNT represents a total count of hash table indexes associated with hash buckets in which the new element $E_n$ is inserted.

At stage 98, an original element $E_o$ is read from the hash table from hash table index $I_n$. At stage 100, element $E_c$ is read from the hash table from hash table index $I_n$. $E_o$ is maintained throughout technique 90 as an indication of the first element replaced in the hash table. $E_c$ is updated in each iteration of technique 90 as $E_n$ is inserted in hash buckets of the hash table and as $I_n$ is incremented.

At stage 102, $E_c$ is tested to see if it is NULL (or has a similar property, such as being empty). If $E_c$ is NULL, control passes to stage 108, which is described later. If $E_c$ is not NULL, control passes to stage 104, where STORED_COUNT is compared to a threshold. The threshold controls how many hash buckets into which the new element $E_n$ is inserted.

The threshold can be determined in a number of different ways. For example, the threshold can be calculated so that each element in the hash table preferably occupies an equal number of hash buckets. In this case, the threshold $T_{E_i}$ for an element $E_i$ can be determined by dividing the total number of hash buckets in the hash table (N) by the number of elements stored in the hash table (e). In an alternate implementation, the threshold can be determined using a weight $w_i$. With a weight, each element can be targeted to occupy a different proportion of the hash buckets of the hash table. In one example of the alternative implementation, the threshold can be calculated as follows:

$$T_{E_i} = \begin{cases} \dfrac{w_i}{\sum w}, & i \ge (N\%e) \\ \dfrac{w_i}{\sum w} + 1, & i < (N\%e) \end{cases} \quad \text{; wherein} \quad (2)$$

$\Sigma w$ is the sum of the weights of all of the elements stored in the hash table.

If the STORED_COUNT is not greater than the threshold, $E_o$ and $E_c$ are compared at stage 106. If $E_o$ and $E_c$ are the same element, control passes to stage 108. At stage 108, $E_n$ is stored in the hash table at hash table index $I_n$. Next, at stage 110, $I_n$ is incremented. Incrementing can mean any change in $I_n$ that points the incremented $I_n$ to the next hash bucket in the hash table. For example, the incrementing can include a modulus operation that loops the value $I_n$ back to the first hash table index of the hash table once the last hash bucket of the hash table is reached. Once $I_n$ is incremented, STORED_COUNT is incremented at stage 112. Control then passes back to stage 100.

Execution of stages 100 through 112 of technique 90 continues as described to determine additional hash table indexes identifying hash table buckets in which the new element $E_n$ is to be added/inserted and to insert $E_n$ into those hash table buckets. Technique 90 completes when the STORED_COUNT is greater than the threshold at stage 106 or if $E_o$ and $E_c$ are not the same element at stage 108.

Figure 6:
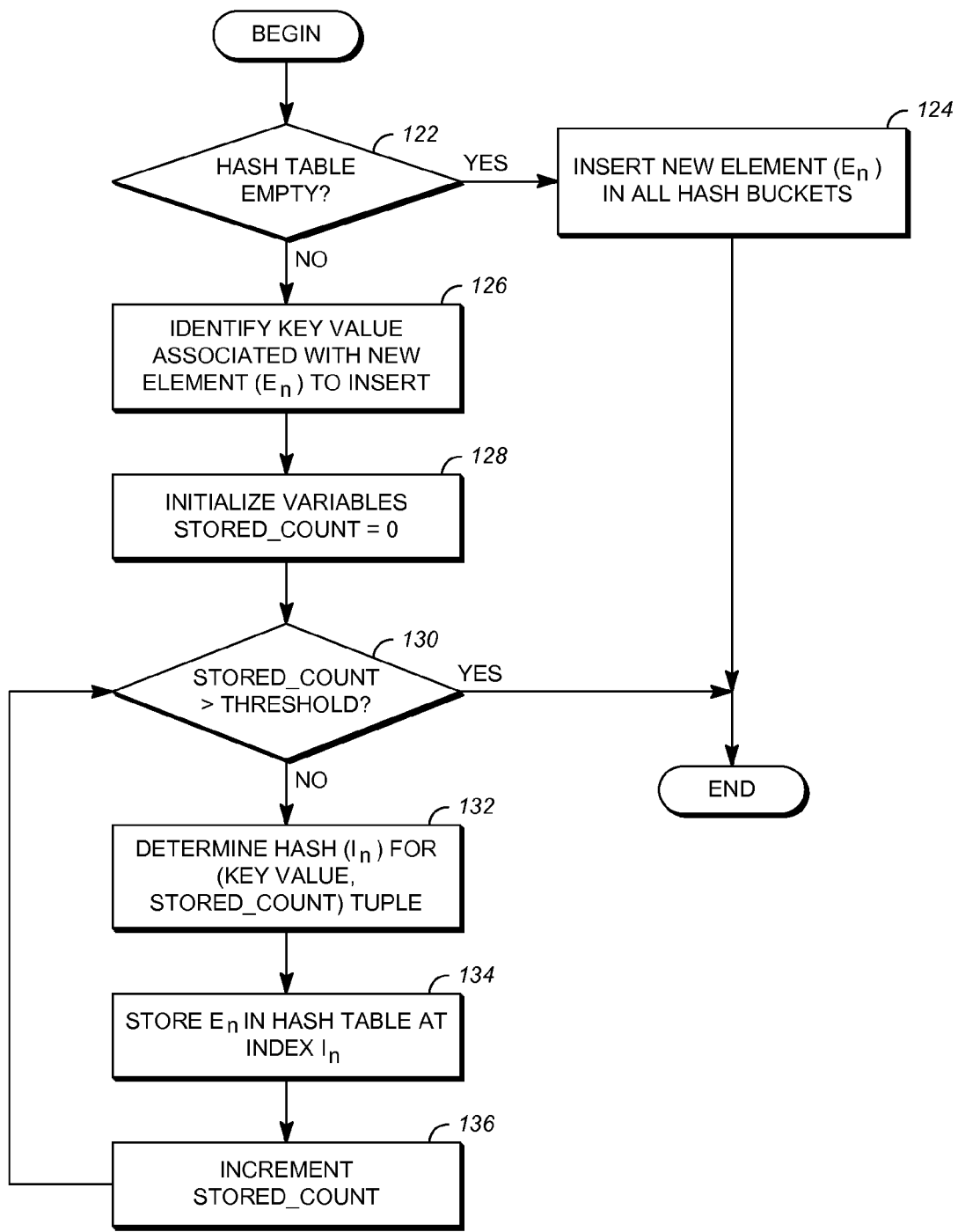
FIG. 6 is a flowchart of another exemplary technique of adding an element to a minimally disruptive hash table according to embodiments of the disclosed subject matter.

FIG. 6 is a flowchart of another exemplary technique 120 of adding an element to a minimally disruptive hash table according to embodiments of the disclosed subject matter. At stage 122, the hash table is checked to see if it is empty. If it is empty, control passes to stage 124, where a new element $E_n$ is inserted into all hash buckets of the hash table. Technique 120 is then completed.

Referring back to stage 122, if the hash table is not empty, control instead passes to stage 126, where a key value associated with the new element $E_n$ to be inserted is identified. Similar to the techniques described above, the key value can be any value associated with the new element $E_n$ or any combination of values. For example, with respect to FIG. 3A above, the key value for an adjacency could be the index number of that adjacency (i.e. 1 or 2).

At stage 128, variables needed for technique 90 are initialized. For example, the variable STORED_COUNT can be initialized to zero. The variable STORED_COUNT tracks the number of hash buckets in which the new element $E_n$ is inserted. Next, STORED_COUNT is compared to a threshold at stage 130. The threshold controls how many hash buckets into which the new element $E_n$ is inserted. The threshold can be determined as previously described with respect to technique 90.

If the STORED_COUNT is less than the threshold, control passes to stage 132, where a hash $I_n$ is determined for a (key value, STORED_COUNT) tuple. STORED_COUNT is added to the input of the hash function in order to distribute entries of the new element $E_n$ throughout the hash table. Next, at stage 134, $E_n$ is stored in a hash bucket of the hash table associated with hash table index $I_n$. At stage 136, STORED_COUNT is incremented. Then, control returns to stage 130. With respect to stage 130, once the STORED_COUNT is greater than the threshold, technique 120 completes.

Techniques 90 and 120 as described and shown are only two possible implementations of adding elements to a minimally disruptive hash table. Other techniques are possible, including those that add, remove, modify, or replace stages of techniques 90 and 120. For example, in an alternative implementation, stage 106 of technique 90 can be omitted. In another alternative implementation, stages 122 and 124 of technique 120 can be omitted.

Figure 7:
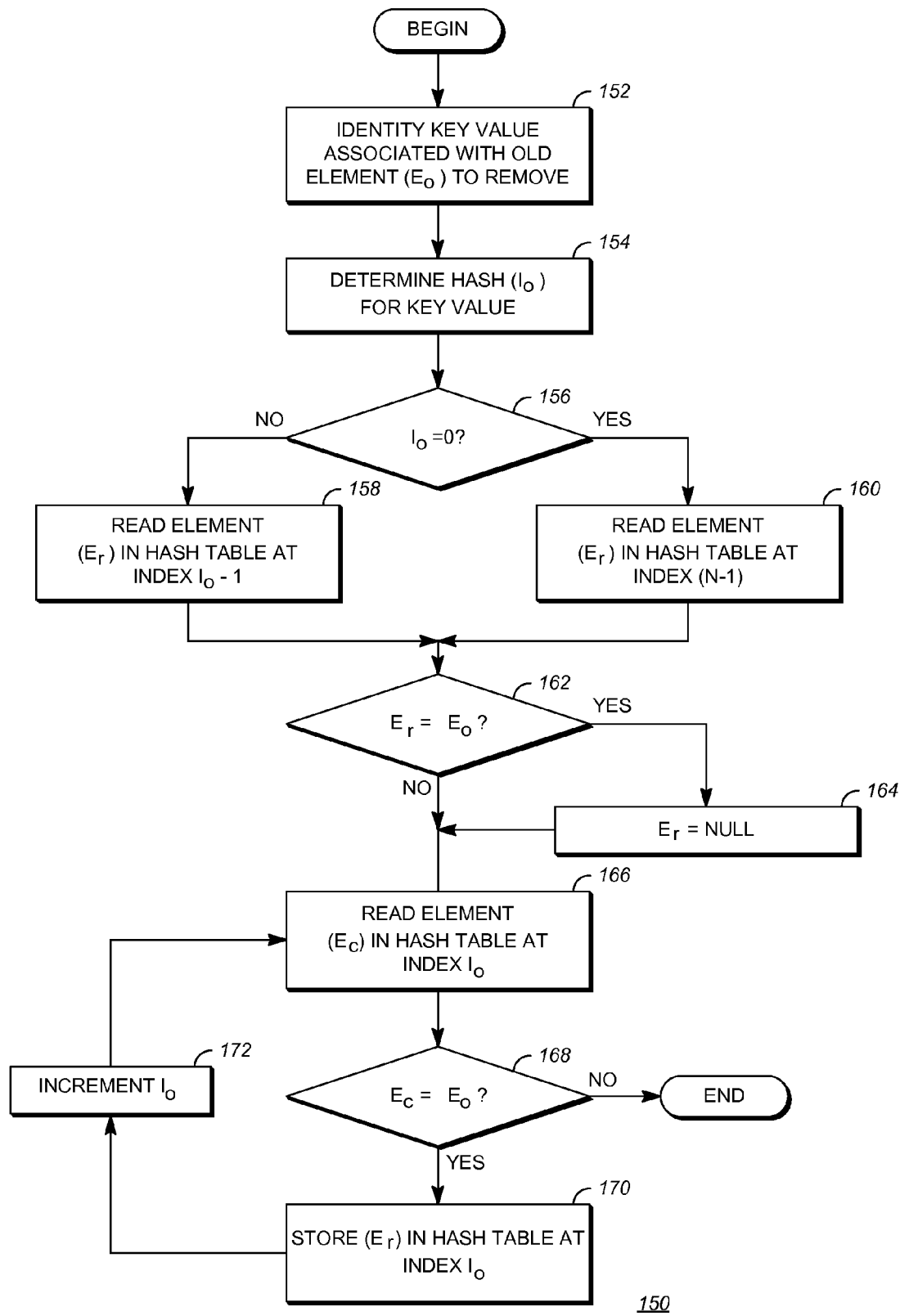
FIG. 7 is a flowchart of one exemplary technique of removing an element from a minimally disruptive hash table according to embodiments of the disclosed subject matter.

FIG. 7 is a flowchart of one exemplary technique 150 of removing an element from a minimally disruptive hash table according to embodiments of the disclosed subject matter. Technique 150 generally can be used with a hash table that uses technique 90 for adding elements.

At stage 152, a key value associated with the old element $E_o$ to be removed is identified. Similar to the techniques described above, the key value can be any value associated with the old element $E_o$ or any combination of values. For example, with respect to FIG. 3A above, the key value for an adjacency could be the index number of that adjacency (i.e. 1 or 2).

Next, a hash $I_o$ is determined at stage 154 for the identified key value. Hash $I_o$ can be determined using any hash function. At stage 156, $I_o$ is compared to zero. If $I_o$ is not zero, control passes to stage 158, where replacement element $E_r$ is read from the hash bucket corresponding to hash table index $I_o-1$. Otherwise, if $I_o$ is zero, control passes to stage 160, where replacement element $E_r$ is read from the hash bucket corresponding to hash table index N−1. In other words, the replacement element $E_r$ corresponds to the element stored before the element to be removed $E_o$ in the hash table.

Next, at stage 162, $E_r$ is compared to $E_o$. If they are equal, $E_r$ is set to NULL (or other indication of an empty value) at stage 164. If they are not equal control passes directly to stage 166. At stage 166, current element $E_c$ is read from the hash bucket corresponding to hash table index $I_o$. Next, at stage 168, $E_c$ is compared to $E_o$. If they are equal, control passes to stage 170, where $E_r$ is stored in the hash table in the hash bucket corresponding to hash table index $I_o$. Next, at stage 172, hash table index $I_o$ is incremented. As described above with respect to $I_n$, the incrementing of $I_o$ can include a modulus operation so that when $I_o$ reaches the end of the hash table, the next value of $I_o$ will correspond to the beginning of the hash table.

Control then passes back to stage 166. Stages 166 through 172 are performed iteratively until $E_c$ does not equal $E_o$ at stage 168, at which point technique 150 completes.

Figure 8:
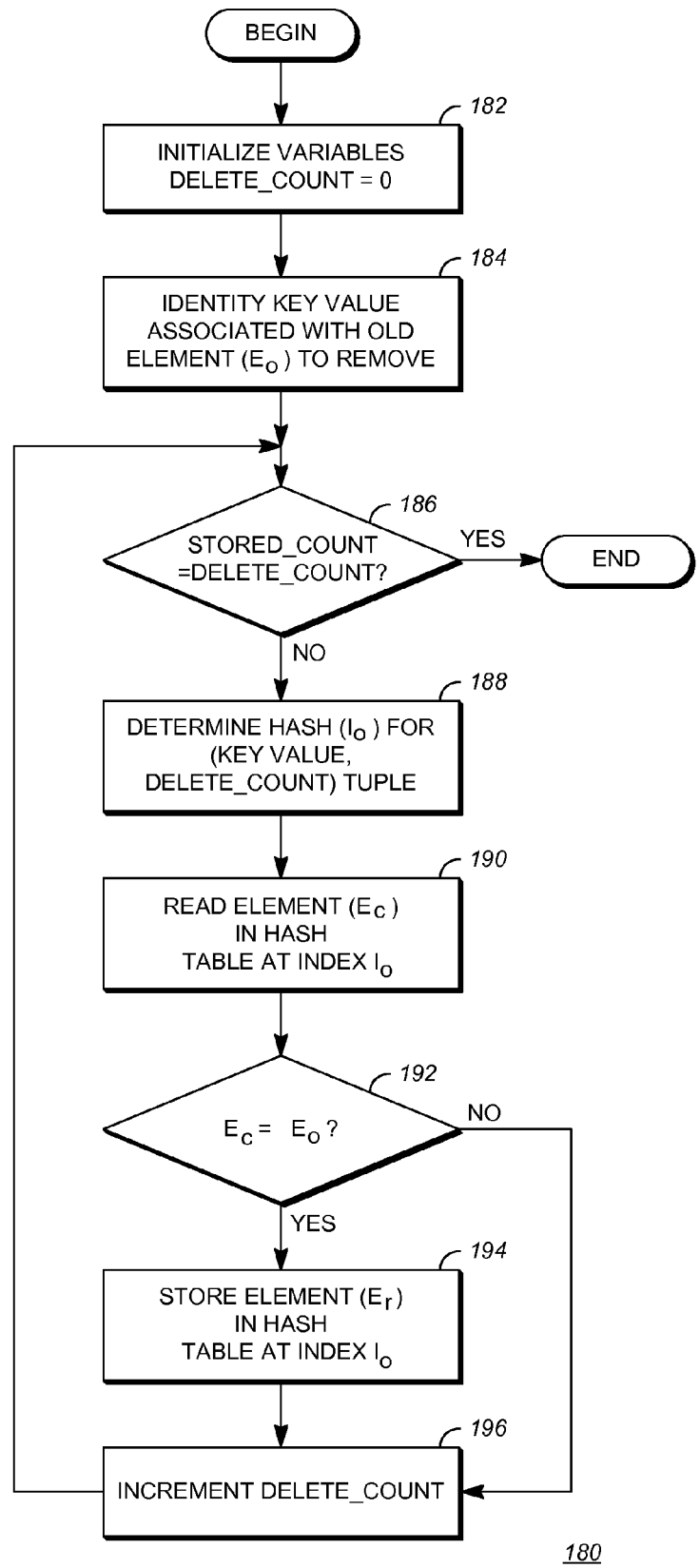
FIG. 8 is a flowchart of another exemplary technique of removing an element from a minimally disruptive hash table according to embodiments of the disclosed subject matter.

FIG. 8 is a flowchart of another exemplary technique 180 of removing an element from a minimally disruptive hash table according to embodiments of the disclosed subject matter. Technique 180 generally can be used with a hash table that uses technique 120 for adding elements. At stage 182, variables needed for technique 90 are initialized. For example, the variable DELETE_COUNT can be initialized to zero. The variable DELETE_COUNT tracks the number of hash buckets from which the old element $E_o$ is removed.

At stage 184, a key value associated with the old element $E_o$ to be removed is identified. Similar to the techniques described above, the key value can be any value associated with the new element $E_o$ or any combination of values. For example, with respect to FIG. 3A above, the key value for an adjacency could be the index number of that adjacency (i.e. 1 or 2).

At stage 186, STORED_COUNT is compared to DELETE_COUNT. STORED_COUNT can be an input to technique 180 and is an indication of a number of hash buckets in which $E_o$ is stored. STORED_COUNT can be determined from values stored in memory that indicate a number of hash buckets that each element of the hash table occupies. For example, the values stored in memory can be updated on each add and remove operation on the hash table. In an alternative implementation, the STORED_COUNT of an element can be determined on demand when a remove operation is to be performed.

If STORED_COUNT is not equal to DELETE_COUNT, control passes to stage 188. At stage 188, a hash $I_o$ is determined for a (key value, DELETE_COUNT) tuple. DELETE_COUNT is added to the input of the hash function in order to find the entries of the element $E_o$ that were stored throughout the hash table when $E_o$ was added to the hash table (for example, by use of technique 90).

Next, at stage 190, current element $E_c$ is read from the hash bucket associated with hash table index $I_o$. At stage 192, $E_c$ is compared to $E_o$. If $E_c$ is equal to $E_o$, control passes to stage 194. Otherwise, stage 194 is skipped and control passes to stage 196. At stage 194, replacement element $E_r$ is stored in the hash table in a hash bucket associated with index $I_o$.

Replacement element $E_r$ can be an input to technique 180. In one example, the replacement element $E_r$ can be selected based on a loading of the hash table. In this case, loading means a comparison between a number of hash table buckets in which a given element is stored in the hash table as compared to an ideal number of buckets that the given element would ideally be stored in based on a total number of hash table buckets and the weight associated with the given element. When selecting the replacement element $E_r$ based on loading, the element stored in the hash table having the lowest loading (i.e. greatest deficiency in number of actual hash table buckets versus ideal number of hash table buckets) will be selected.

Next, at stage 196, DELETE_COUNT is incremented. Control then returns to stage 186. Technique 180 continues until STORED_COUNT is equal to DELETE_COUNT at stage 186, at which point technique 180 completes.

Exemplary hash functions usable within the techniques herein (including hash function 54) can include primitive polynomials such as cyclic redundancy check (CRC) functions or cryptographic functions such as MD5 functions. Specific functions include but are not limited to modulo, pseudo modulo, XOR, folded XOR, CRC4, CRC8, CRC16, CRC24, CRC32, MD5, Elliptic Curve Signing, SHA1, and SHA256. Suitable hash functions include those providing good distribution across all of the hash table buckets, those having uncorrelated distributions, fast execution times, and small memory requirements. However, any hash function can be utilized.

In one alternative implementation, a transformed hash function can be used to reduce the number of hash table buckets actually stored in memory. For example, a hash table can be created with $2^{32}$ (4,294,967,295) hash table buckets. Such a hash table could utilize a CRC32 (32 bit CRC) hash function to generate hash table indexes associated with the hash table buckets. If only a relatively small number of elements are to be stored in the hash table at a given time, it can be advantageous to store only a portion of the hash table buckets in physical memory in order to improve processing efficiency and to reduce memory utilization.

In this instance, the hash function can be transformed so that the range of the hash function output is reduced to cover only a portion of the hash table buckets. For example, the output of the hash function can be truncated. In one implementation, the output function can be truncated to 8 bits. In one example, the most significant 24 bits of the hash function output are set to zero (discarded). In this case only $2^8$ hash table buckets would be stored in memory. In this case, the hash table still logically has $2^{32}$ hash table buckets, just $2^{24}$ of those hash table buckets would not be stored in memory and the key values that would normally be associated with those non-stored hash table buckets instead are associated with (redirected to) stored hash table buckets.

In order to increase the number of hash table buckets stored in memory, the transformation is changed so that the range of the transformed hash function output is increased. The change in transformation maintains the association between key values and stored elements. In an extension of the implementation described above, the truncation of the output function could be changed to 9 bits instead of 8 bits. In this case, $2^9$ hash table buckets would be now stored in memory. The additional hash table buckets stored in memory are interleaved with the previously stored hash table buckets, with each additional hash table bucket being associated with one previously stored hash table bucket. The additional hash table buckets are initialized with an element by copying the element stored in the previously stored hash table bucket associated with each additional hash table bucket. Accordingly, the change in the number of hash table buckets stored in memory does not affect the key value to element associations of the hash table.

The examples described above of transforming the hash function and reducing the number of hash table buckets stored in memory is only one implementation of these techniques. Other implementations are also available. For example, in other implementations, different transformation functions can be utilized instead of truncation and different hash functions can be used instead of CRC.

Figure 9:
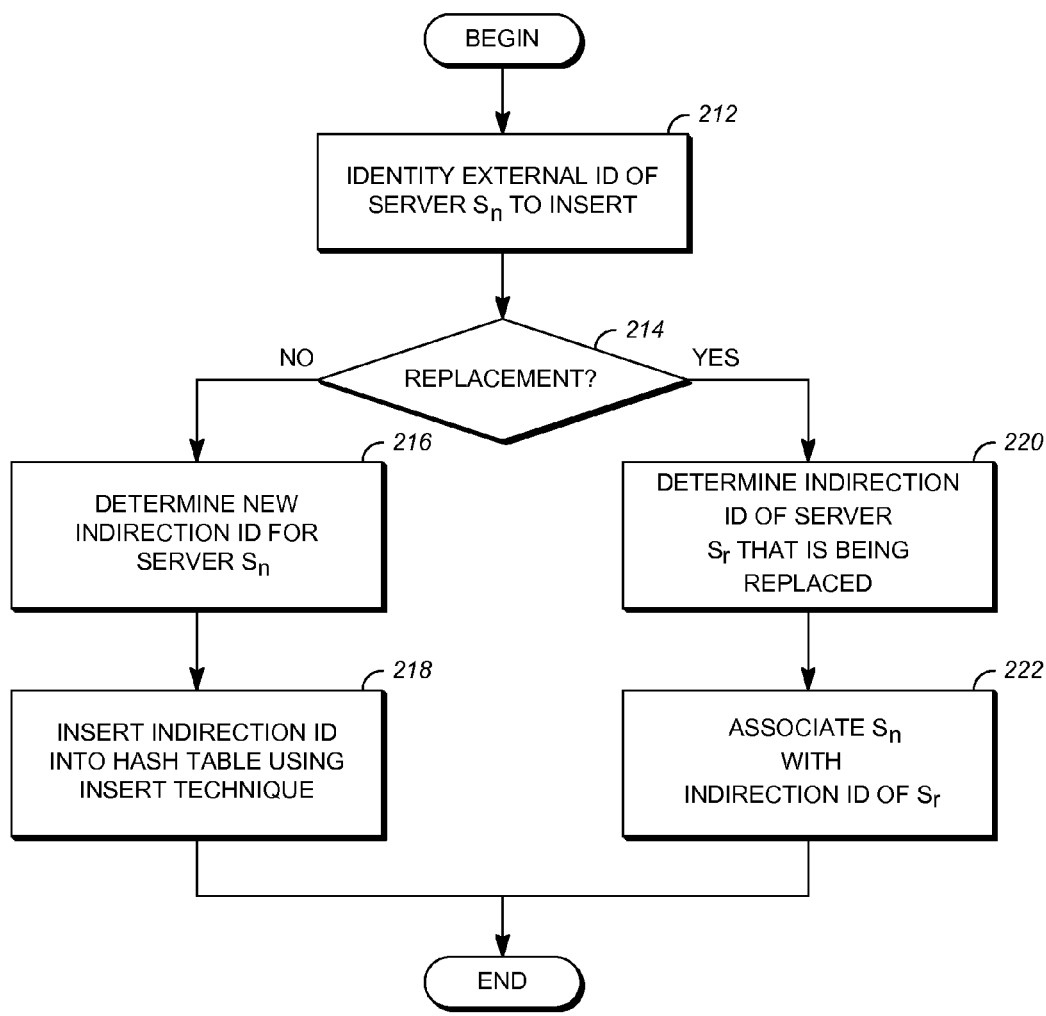
FIG. 9 is a flowchart of a technique of adding a server to a server load balancing hash table according to embodiments of the disclosed subject matter.
Figure 10:
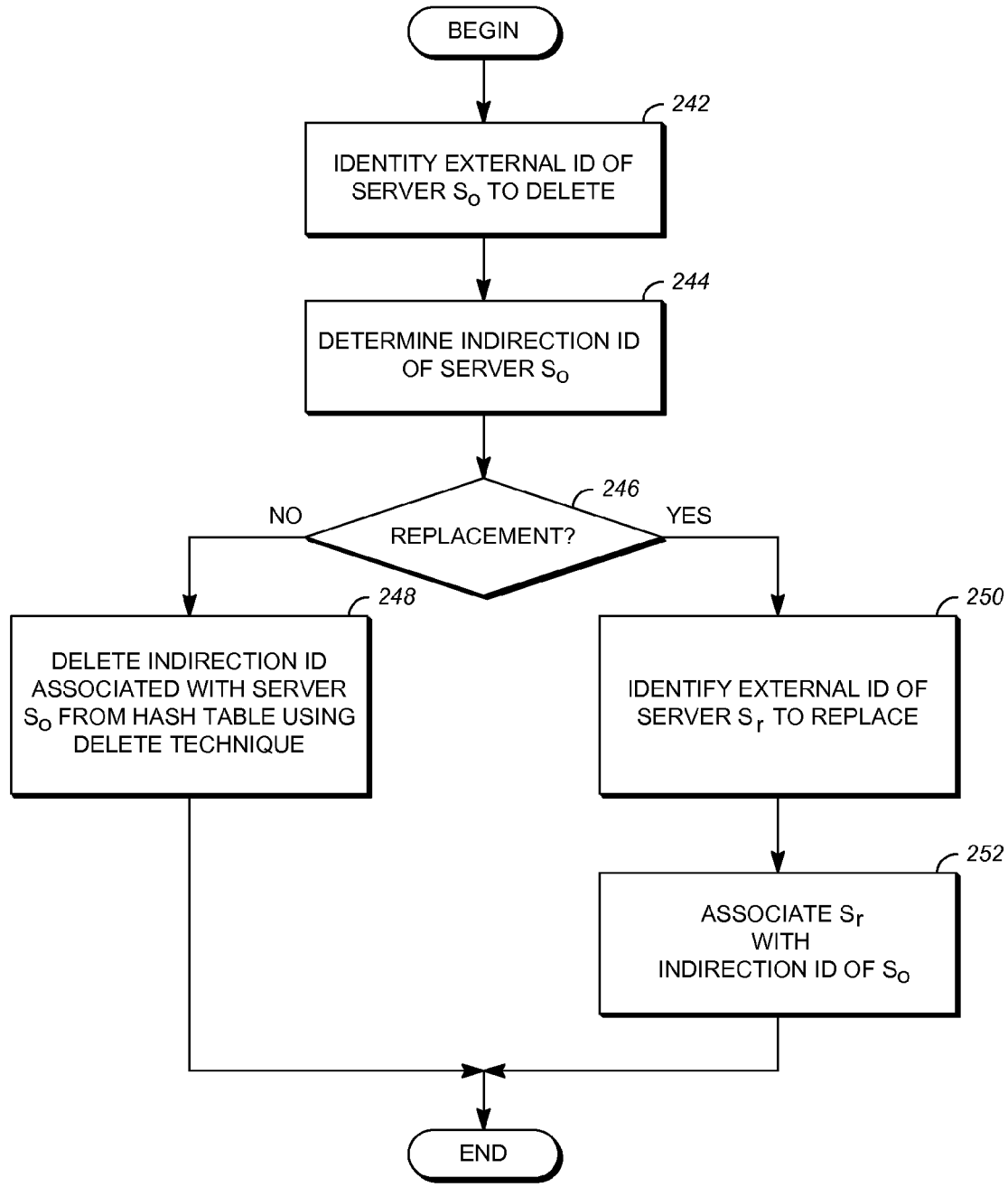
FIG. 10 is a flowchart of a technique of removing a server from a server load balancing hash table according to embodiments of the disclosed subject matter.
Figure 11:
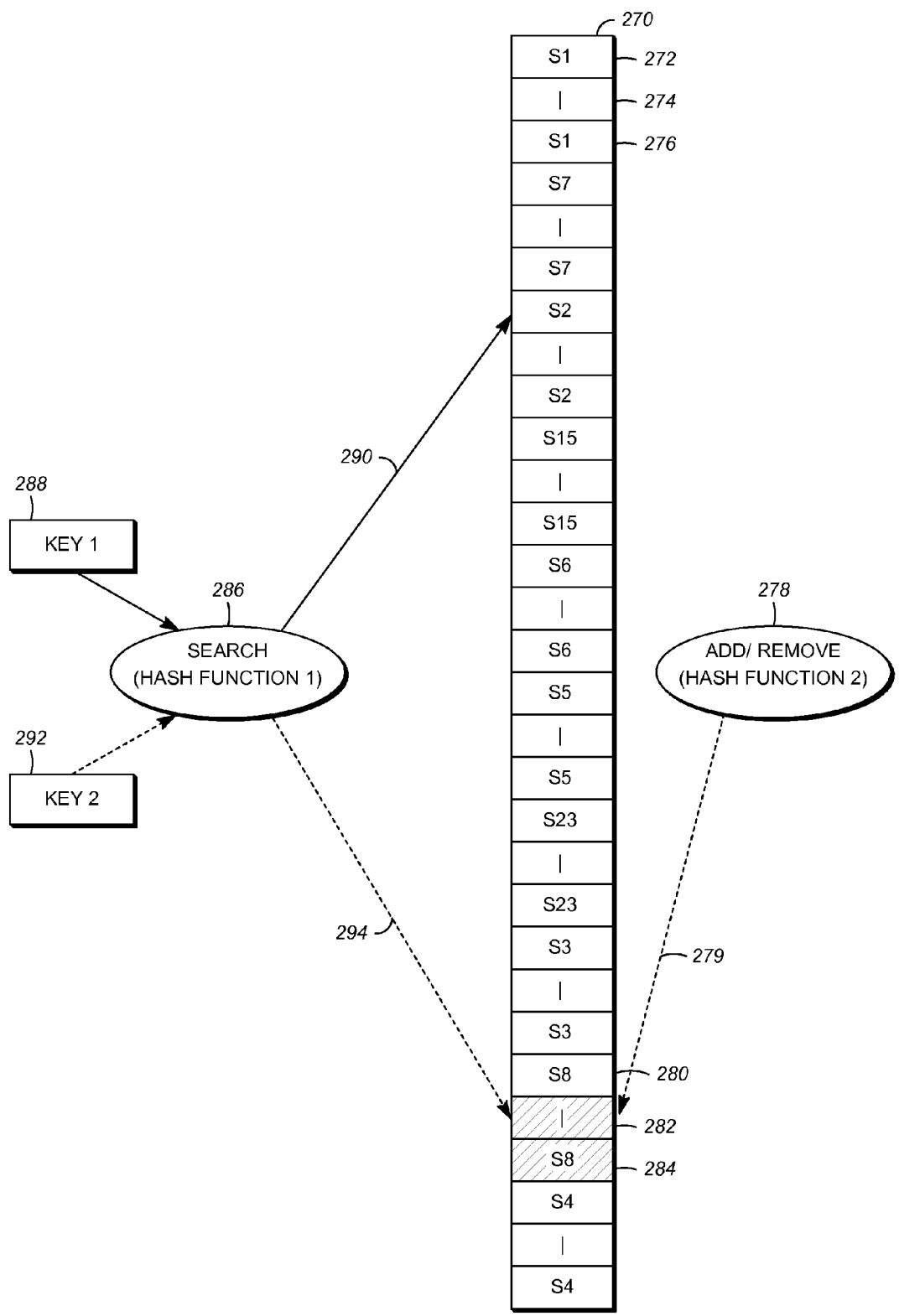
FIG. 11 is a block diagram of an exemplary minimally disruptive hash table used for server load balancing according to embodiments of the disclosed subject matter.

FIGS. 9-11 are related to server load balancing using minimally disruptive hash tables as described previously. The server load balancing hash table described below is an implementation of a minimally disruptive hash table. FIG. 9 is a flowchart of a technique 210 of adding a server to a server load balancing hash table according to embodiments of the disclosed subject matter. At stage 212, an external identifier of a server S, to be inserted into the server load balancing hash table is identified. The external identifier can be any identifier that enables identification of and/or access to the server $S_n$. For example, the external identifier can be a network address (e.g. IP address) or a network name (e.g. DNS computer name).

Next, at stage 214, it is determined whether $S_n$ is a replacement server or an additional server to be added to the server load balancing hash table. This determination can be made based on an input to technique 210. If the server $S_n$ is not a replacement, control passes to stage 216, where a new indirection identifier is determined for $S_n$. The indirection identifier is related to a server indirection table used to map the external identifiers of servers into the server load balancing hash table. For example, each entry in the server indirection table can include an external identifier of a server and an indirection identifier of the server. The indirection identifier is used in the server load balancing hash table.

At stage 218, the indirection identifier of $S_n$ is inserted into the server load balancing hash table using an insertion technique. For example, technique 90 or technique 120 can be utilized. Other similar techniques can also be utilized. Once the indirection identifier of $S_n$ is inserted, technique 210 completes.

Referring back to stage 214, if the server $S_n$ is a replacement, control passes to stage 220 where the indirection identifier of the server $S_r$ to be replaced is identified. Next, at stage 222, $S_n$ is associated with the indirection identifier of $S_r$ by replacing $S_r$ in the server indirection table. For example, the replacement server can be a hot-spare server. In this exemplary implementation, replacing a server does not require any changes to the server load balancing hash table since only the indirection identifier is reallocated to the new server. Once the indirection identifier is reallocated, technique 210 completes.

The above is only one implementation of technique 210 and other implementations are available that add, remove, modify, or combine stages. For example, in an alternative implementation, the server indirection table can be omitted and additional and replacement servers can be inserted directly into the server load balancing hash table.

In another alternative implementation, stage 218 and its associated insert technique can be modified to distribute any disruption caused by the insertion over time. For example, if $S_n$ is to be inserted with a target weight w, $S_n$ can first be inserted using an initial weight, such as w/10. Additional insertions using a fraction of weight w can be performed over a period of time until the total insertions equal the target weight w that is desired. Such a phased-in process can distribute any disruption seen to network flows distributed out over time. This process can also be utilized in conjunction with a temporary session state table as described earlier.

FIG. 10 is a flowchart of a technique 240 of removing a server from a server load balancing hash table according to embodiments of the disclosed subject matter. At stage 242, an external identifier of a server $S_o$ to be deleted is identified. The external identifier can be supplied as input to technique 240. Next, at stage 244, an indirection identifier is determined for the server $S_o$. The indirection identifier can be determined by a lookup of the external identifier in the server indirection table.

Next, at stage 246, it is determined whether $S_o$ is to be replaced or simply removed from the server load balancing hash table. If $S_o$ is to be removed, control passes to stage 248, where the indirection identifier is deleted (removed) from the server load balancing hash table using a deletion (removal) technique. For example, technique 150 or technique 180 can be utilized. Other similar techniques can also be utilized. Once the indirection identifier of $S_o$ is removed, technique 240 completes.

Referring back to stage 246, if the server $S_o$ is to be replaced, control passes to stage 250 where the external identifier of a server $S_r$ to replace server $S_o$ is identified. Next, at stage 252, $S_r$ is associated with the indirection identifier of $S_o$ by replacing $S_o$ in the server indirection table. In this exemplary implementation, replacing a server does not require any changes to the server load balancing hash table since only the indirection identifier is reallocated to the replacement server. Once the indirection identifier is reallocated, technique 250 completes.

The above is only one implementation of technique 250 and other implementations are available that add, remove, modify, or combine stages. For example, in an alternative implementation, the server indirection table can be omitted and if a server is replaced instead of removed, an identifier of the replacement server can be inserted directly into the server load balancing hash table.

FIG. 11 is a block diagram of an exemplary server load balancing hash table 270 used for server load balancing according to embodiments of the disclosed subject matter. As mentioned previously, server load balancing hash table 270 is an implementation of a minimally disruptive hash table. Server load balancing hash table 270 as shown utilizes techniques similar to technique 90 and 150. Server load balancing hash table 270 includes a number of hash table buckets that store indirection identifiers of a number of servers. For example, a first hash table bucket 272 includes an indirection identifier associated with a server "S2." First hash table bucket 272 is the first bucket storing an indirection identifier associated with server "S2" and is followed by a number of intermediate hash table buckets 274 and a last hash table bucket 276 also storing the indirection identifier of server "S2."

Indirection identifiers associated with servers are added to and removed from server load balancing hash table 270 using hash function 2 as shown by operation 278. Hash function 2 is used to identify a hash table index of the server load balancing hash table 270 where indirection identifiers are to be added or removed. For example, an addition 279 for a new indirection identifier (e.g. "S9") can be performed using technique 210 and technique 90.

In the shown example, first hash table bucket 280, intermediate hash table buckets 282, and last hash table bucket 284 all include indirection identifier "S8" before addition 279 is completed. After addition 279 is completed, at least some of the intermediate hash table buckets 282 and the last hash table bucket 284 will include new indirection identifier "S9."

Incoming network traffic can be assigned to servers using operation 286 which is a search operation using hash function 1. Operation 286 can take as input, for example, Key 1 288 and Key 2 292. Key 1 288 and Key 2 292 can each be, for example, a tuple of data representing an incoming network packet. In one example, a tuple including the source IP address, destination IP address, protocol type, source port, and destination port is used. The values used for the key typically will have the characteristic of maintaining their values over all network packets within a network flow.

The hash functions used for operation 278 and operation 286 can be different. The hash function selected for each can be varied due to the different inputs to operation 278 and operation 286 and/or to tailor the properties of the hash function to optimize each of operation 278 and operation 286. In some circumstances a same or similar hash function can be used.

Search 290 uses a hash of Key 1 288 to identify an indirection identifier (element) stored in a hash table bucket. In the case shown, the indirection identifier is "S2." The indirection identifier "S2" can be looked up in the indirection table to obtain an external identifier for the server associated with indirection identifier "S2" so that the network packet can be forwarded and/or routed to that server.

Correspondingly, search 294 uses a hash of Key 2 290 to also identify an indirection identifier stored in a hash table bucket. In the case shown, the indirection identifier is "S8" before addition 279 and "S9" after addition 279. The indirection identifier "S8" or "S9" can be looked up in the indirection table to obtain an external identifier for the server associated with the retrieved indirection identifier so that the network packet can be forwarded to the appropriate server. Search 294 illustrates a use-case where an addition of a server to hash table 270 results in a disassociation between a key (i.e. Key 2 290) and its associated server. However, any disassociations are limited to the hash tables in which the new server is added (e.g. the cross-hatched hash table buckets 282, 284). Such disassociations can be avoided or lessened by the use of temporary session state table(s) as described earlier.

The embodiments of load balancing device 12 and/or servers 22a-c (and the algorithms, techniques, instructions etc. stored thereon and/or executed thereby) can be realized in hardware including, for example, computers, IP cores, application-specific integrated circuits (ASICs), programmable logic arrays, optical processors, programmable logic controllers, microcode, firmware, microcontrollers, computing devices, microprocessors, digital signal processors or any other suitable circuit. As used herein, the term "processor" should be understood as encompassing any the foregoing hardware, either singly or in combination. The terms "signal" and "data" are used interchangeably. Further, portions of load balancing device 12 and/or servers 22a-c do not necessarily have to be implemented in the same manner.

Further, in one example, load balancing device 12 and/or servers 22a-c can be implemented using a general purpose computer/processor with a computer program that, when executed, carries out any of the respective techniques, algorithms and/or instructions described herein. In addition or alternatively, for example, a special purpose computer/processor can be utilized which can contain specialized hardware for carrying out any of the techniques, algorithms, or instructions described herein.

Implementations or portions of implementations of the above disclosures can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time.

The exemplary approaches herein have been described in order to allow easy understanding of the disclosed subject matter and do not limit the disclosed subject matter. On the contrary, the disclosed subject matter is intended to cover various modifications and equivalent arrangements included within the scope of the appended claims, which scope is to be accorded the broadest interpretation so as to encompass all such modifications and equivalent structure as is permitted under the law.

What is claimed is:

1. A method of load balancing a plurality of network packets among a plurality of servers using a minimally disruptive hash table having a plurality of hash table buckets, the method comprising:
   identifying a plurality of elements, each element corresponding to at least one of the plurality of servers;
   inserting at least two of the identified plurality of elements into the minimally disruptive hash table so that at least some of the hash table buckets each include one of the plurality of elements;
   receiving one of the plurality of network packets;
   determining a hash table index for the received network packet using a hash function;
   identifying an element stored in a hash table bucket corresponding to the hash table index; and
   transmitting the received network packet to a server corresponding to the identified element.

2. The method of claim 1, wherein the hash function is a first hash function and inserting the at least two of the plurality of elements includes determining a plurality of hash table indexes using a second hash function on key values of the at least two elements.

3. The method of claim 2, wherein each element corresponds to the at least one server based on an entry in a server indirection table, each entry in the server indirection table including an external identifier of a server of the plurality of servers and an indirection identifier, and wherein the key value of each element is the indirection identifier.

4. The method of claim 3, wherein inserting a current element of the plurality of elements comprises:
   determining a target weight associated with the current element, the target weight indicating a proportion of hash table buckets in which the current element is to be stored;
   determining an initial weight, the initial weight being a fraction of the target weight;
   inserting the current element into a number of hash table buckets based on the initial weight; and
   iteratively inserting the current element into a larger number of hash table buckets over a period of time until the current element is stored in a number of hash table buckets based on the target weight.

5. The method of claim 3, further comprising:
   inserting an additional element into the identified hash table bucket, the additional element replacing the identified element; and
   updating a session state table to enable one or more additional network packets associated with the received network packet to be transmitted to a server corresponding to the identified element instead of the additional element.

6. The method of claim 3, further comprising:
   replacing one of the plurality of servers with a hot spare server by replacing an external identifier of the server to be replaced with an external identifier of the hot spare server in at least one entry in the server indirection table.

7. The method of claim 3, wherein determining the hash table index comprises:
   identifying a key value of the received network packet, the key value including each of the following values associated with the received network packet: a source IP, a destination IP, a protocol type, a source port number, and a destination port number; and
   determining the hash table index using the first hash function on the key value.

8. The method of claim 1, wherein the network packet is a first network packet, further comprising:
   receiving a second network packet of the plurality of network packets;
   determining that the second network packet is to be load balanced using a session state table;
   identifying a destination server of the plurality of servers using the session state table; and
   transmitting the second network packet to the destination server.

9. The method of claim 1, wherein transmitting the received network packet comprises:
   encapsulating the received network packet into a container packet, the container packet including a header having a network address of the server corresponding to the identified element; and
   transmitting the container packet to the server corresponding to the identified element.

10. A computing system for load balancing a plurality of network packets among a plurality of servers using a minimally disruptive hash table having a plurality of hash table buckets, the computing system comprising:
    at least one memory; and
    at least one processor configured to execute instructions stored in the at least one memory to:
       identify a plurality of elements, each element corresponding to at least one of the plurality of servers,
       insert at least two of the identified plurality of elements into the minimally disruptive hash table so that at least some of the hash table buckets each include one of the plurality of elements,
       receive one of the plurality of network packets,
       determine a hash table index for the received network packet using a hash function,
       identify an element stored in a hash table bucket corresponding to the hash table index, and
       transmit the received network packet to a server corresponding to the identified element.

11. The computing system of claim 10, wherein the hash function is a first hash function and inserting the at least two of the plurality of elements includes determining a plurality of hash table indexes using a second hash function on key values of the at least two elements.

12. The computing system of claim 11, wherein each element corresponds to an entry in a server indirection table, each entry in the server indirection table including an external identifier of a server of the plurality of servers and an indirection identifier, and wherein the key value of each element is the indirection identifier.

13. The computing system of claim 12, wherein the instructions to insert a current element of the plurality of elements includes instructions to:
- determine a target weight associated with the current element, the target weight indicating a proportion of hash table buckets in which the current element is to be stored;
- determine an initial weight, the initial weight being a fraction of the target weight;
- insert the current element into a number of hash table buckets based on the initial weight; and
- iteratively insert the current element into a larger number of hash table buckets over a period of time until the current element is stored in a number of hash table buckets based on the target weight.

14. The computing system of claim 12, wherein the at least one memory further includes instructions to:
- insert an additional element into the identified hash table bucket, the additional element replacing the identified element; and
- update a session state table to enable one or more additional network packets associated with the received network packet to be transmitted to a server corresponding to the identified element instead of the additional element.

15. The computing system of claim 12, wherein the instructions to determine the hash table index includes instructions to:
- identify a key value of the received network packet, the key value including each of the following values associated with the received network packet: a source IP, a destination IP, a protocol type, a source port number, and a destination port number; and
- determine the hash table index using the first hash function on the key value.

16. The computing system of claim 10, wherein the network packet is a first network packet, and the at least one memory further includes instructions to:
- receive a second network packet of the plurality of network packets;
- determine that the second network packet is to be load balanced using a session state table;
- identify a destination server of the plurality of servers using the session state table; and
- transmit the second network packet to the destination server.

17. The computing system of claim 10, wherein the instructions to transmit the received network packet includes instructions to:
- encapsulate the received network packet into a container packet, the container packet including a header having a network address of the server corresponding to the identified element; and
- transmit the container packet to the server corresponding to the identified element.

18. A computer-readable medium having computer-executable instructions for performing a method of load balancing a plurality of network packets among a plurality of servers using a minimally disruptive hash table having a plurality of hash table buckets comprising:
- identifying a plurality of elements, each element corresponding to at least one of the plurality of servers;
- inserting at least two of the identified plurality of elements into the minimally disruptive hash table so that at least some of the hash table buckets each include one of the plurality of elements;
- receiving one of the plurality of network packets;
- determining a hash table index for the received network packet using a hash function;
- identifying an element stored in a hash table bucket corresponding to the hash table index; and
- transmitting the received network packet to a server corresponding to the identified element.

19. The computer-readable medium of claim 18, wherein the hash function is a first hash function and inserting the at least two of the plurality of elements includes determining a plurality of hash table indexes using a second hash function on key values of the at least two elements.

20. The computer-readable medium of claim 19, wherein each element corresponds to an entry in a server indirection table, each entry in the server indirection table including an external identifier of a server of the plurality of servers and an indirection identifier, and wherein the key value of each element is the indirection identifier.

* * * * *